(12) United States Patent
Tani

(10) Patent No.: US 12,094,250 B2
(45) Date of Patent: Sep. 17, 2024

(54) IMAGE PROCESSING APPARATUS, CONTROL METHOD, AND NON-TRANSITORY STORAGE MEDIUM

(71) Applicant: NEC Corporation, Tokyo (JP)

(72) Inventor: Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 17/436,211

(22) PCT Filed: Mar. 7, 2019

(86) PCT No.: PCT/JP2019/009050
§ 371 (c)(1),
(2) Date: Sep. 3, 2021

(87) PCT Pub. No.: WO2020/179052
PCT Pub. Date: Sep. 10, 2020

(65) Prior Publication Data
US 2022/0130174 A1  Apr. 28, 2022

(51) Int. Cl.
*G06V 40/20* (2022.01)
*G06T 11/40* (2006.01)
*G06V 40/16* (2022.01)

(52) U.S. Cl.
CPC .............. *G06V 40/20* (2022.01); *G06T 11/40* (2013.01); *G06V 40/172* (2022.01)

(58) Field of Classification Search
CPC ...... G06V 40/20; G06V 40/172; G06V 20/52; G06V 40/103; G06T 11/40; G06T 11/00; G08B 25/00; H04N 7/18
USPC ............................ 382/103, 282; 348/143, 77
See application file for complete search history.

(56) References Cited

U.S. PATENT DOCUMENTS

| | | | | |
|---|---|---|---|---|
| 2002/0176610 A1* | 11/2002 | Okazaki | ................. | G06V 40/16 348/161 |
| 2002/0191817 A1* | 12/2002 | Sato | ..................... | G06V 40/172 382/118 |
| 2004/0240542 A1* | 12/2004 | Yeredor | ............. | G08B 13/1968 348/169 |
| 2009/0060278 A1* | 3/2009 | Hassan-Shafique | ........................ | G08B 13/19602 382/103 |

(Continued)

FOREIGN PATENT DOCUMENTS

JP  2009-225398 A  10/2009
JP  2010-166288 A   7/2010

(Continued)

OTHER PUBLICATIONS

International Search Report for PCT Application No. PCT/JP2019/009050, mailed on May 28, 2019.

*Primary Examiner* — Kathleen Y Dulaney

(57) ABSTRACT

An image processing apparatus (2000) acquires a video frame (14), and detects a person from the acquired video frame (14). The image processing apparatus (2000) determines whether the detected person (30) satisfies a predetermined condition based on a permission list (40). The image processing apparatus (2000) performs, on an image region in the video frame (14) representing the person (30) determined to satisfy the predetermined condition, first treatment processing of setting the person (30) in a hardly identified state. The predetermined condition includes a condition that the person (30) is included in the permission list (40).

13 Claims, 6 Drawing Sheets

(56) References Cited

U.S. PATENT DOCUMENTS

| | | | |
|---|---|---|---|
| 2009/0324010 A1* | 12/2009 | Hou | G06V 20/52 |
| | | | 382/103 |
| 2014/0023248 A1 | 1/2014 | Yoo et al. | |
| 2016/0019415 A1* | 1/2016 | Ra | G06T 7/73 |
| | | | 382/197 |
| 2016/0104035 A1* | 4/2016 | Wang | G06V 20/52 |
| | | | 382/118 |
| 2016/0247039 A1* | 8/2016 | Yazaki | G06V 40/103 |
| 2016/0364615 A1 | 12/2016 | Sakoda et al. | |
| 2017/0046891 A1* | 2/2017 | Trivelpiece | G07C 9/00309 |
| 2018/0088527 A1* | 3/2018 | Bostick | G09G 5/00 |
| 2018/0115749 A1* | 4/2018 | Toshiyuki | G08B 13/19613 |
| 2018/0137632 A1* | 5/2018 | Takada | G06V 30/248 |
| 2018/0239953 A1* | 8/2018 | Miwa | G08B 25/04 |
| 2018/0278892 A1* | 9/2018 | Zhang | H04N 7/188 |
| 2019/0034721 A1* | 1/2019 | Mefford | G06V 10/145 |
| 2019/0377958 A1* | 12/2019 | Geiler | G08B 13/19686 |
| 2021/0256710 A1* | 8/2021 | Liu | G06T 7/73 |

FOREIGN PATENT DOCUMENTS

| | | |
|---|---|---|
| JP | 2016-012752 A | 1/2016 |
| WO | 2015/136796 A1 | 9/2015 |

\* cited by examiner

IMAGE PROCESSING APPARATUS, CONTROL METHOD, AND NON-TRANSITORY STORAGE MEDIUM

This application is a National Stage Entry of PCT/JP2019/009050 filed on Mar. 7, 2019, the contents of all of which are incorporated herein by reference, in their entirety.

TECHNICAL FIELD

The present invention relates to image processing.

BACKGROUND ART

A system for supporting surveillance (video surveillance) of a facility and the like using a video has been developed. For example, Patent Document 1 discloses a technique for generating a video acquired by superimposing surveillance videos in different times in order to shorten a length of the surveillance video. Herein, a video in a period including a person having high reliability is excluded from a target of superimposition.

RELATED DOCUMENT

Patent Document

[Patent Document 1] Japanese Patent Application Publication No. 2010-166288

DISCLOSURE OF THE INVENTION

Technical Problem

The present inventor found out a new technique for supporting video surveillance. An object of the present invention is to provide a new technique for supporting video surveillance.

Solution to Problem

An image processing apparatus according to the present invention includes 1) a detection unit that acquires a video frame, and detects a person from the acquired video frame, 2) a determination unit that determines whether the detected person satisfies a predetermined condition based on a permission list, and 3) a first treatment processing unit that performs, on an image region in the video frame representing the person being determined to satisfy the predetermined condition, first treatment processing of setting the person in a hardly identified state. The predetermined condition includes a condition that the person is indicated in the permission list.

A control method according to the present invention is executed by a computer. The control method includes 1) a detection step of acquiring a video frame, and detecting a person from the acquired video frame, 2) a determination step of determining whether the detected person satisfies a predetermined condition based on a permission list, and 3) a first treatment processing step of performing, on an image region in the video frame representing the person being determined to satisfy the predetermined condition, first treatment processing of setting the person in a hardly identified state. The predetermined condition includes a condition that the person is indicated in the permission list.

A program according to the present invention causes a computer to execute each step included in the control method according to the present invention.

Advantageous Effects of Invention

The present invention provides a new technique for supporting video surveillance.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted. Further, in each block diagram, each block represents a configuration of a functional unit instead of a configuration of a hardware unit unless otherwise described.

Example Embodiment 1

Summary of Invention

Figure 1:
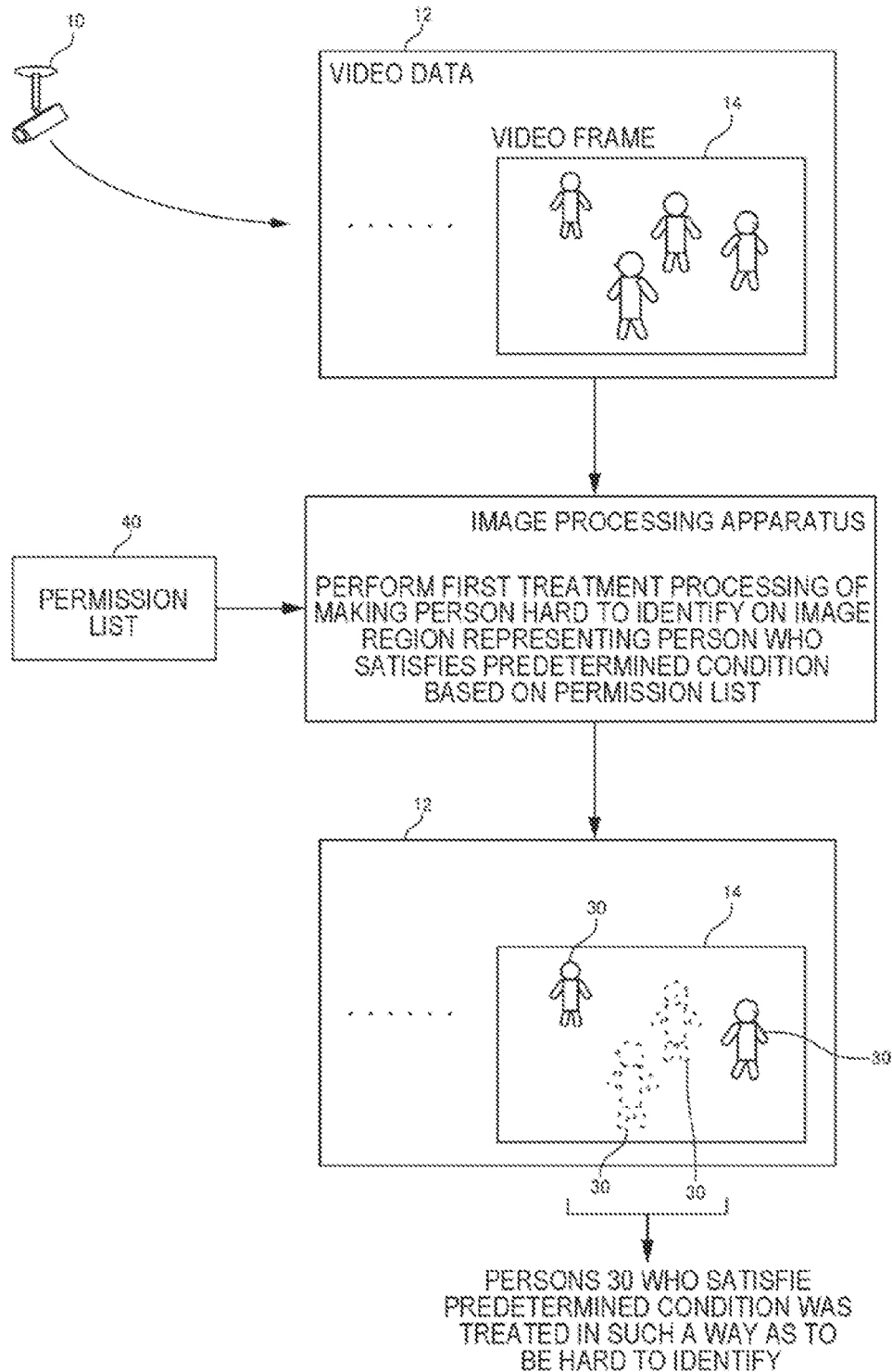
FIG. 1 is a diagram illustrating an outline of an image processing apparatus according to an example embodiment 1.

FIG. 1 is a diagram illustrating an outline of an image processing apparatus 2000 according to an example embodiment 1. A camera 10 is installed at a place to be surveyed, and generates video data 12 by performing capturing. The place to be surveyed is a facility such as an airport, a station of a railway, and a stadium, for example. Note that, the place to be surveyed is not limited to indoor, and may be an outdoor place such as a road and an outdoor facility.

The image processing apparatus 2000 detects a person from each video frame 14 constituting the video data 12, and determines whether the detected person satisfies a predetermined condition based on a permission list 40. Hereinafter, a person detected from the video frame 14 is also expressed as a person 30. The predetermined condition based on the permission list 40 includes at least a condition that the "person 30 is included in the permission list 40".

When a person 30 satisfies a predetermined condition, the image processing apparatus 2000 performs first treatment processing on an image region (hereinafter, a person region) representing the person 30. The first treatment processing is processing of making a person hard to identify (making identification difficult). As an example of the first treatment processing, there are processing of preventing the person 30 from being included in the video frame 14 (deleting the person 30 from the video frame 14) by superimposing a background on a person region, processing of blending a person region with a background, and the like. Note that, the first treatment processing may be performed only on a part of a person region (for example, only on a region of a face) instead of the entire person region. Details of a variation of the first treatment processing will be described later.

Advantageous Effect

The image processing apparatus 2000 according to the present example embodiment performs the first treatment processing of making a person 30 hard to identify on the person 30 who satisfies a predetermined condition based on the permission list 40 among the persons 30 detected from the video frame 14. In this way, a person who does not satisfy the predetermined condition based on the permission list 40 relatively becomes conspicuous. According to this method, even when the plurality of persons 30 are detected from the video frame 14, video surveillance that focuses on a person who does not satisfy the predetermined condition based on the permission list 40 can be performed. Thus, even when the plurality of persons 30 are detected from the video frame 14, i.e., even when the plurality of persons 30 are simultaneously included in the video data 12, video surveillance can be facilitated.

Further, a person who dislikes to have his/her behavior being surveyed is present among persons who do not take suspicious behavior, and thus it is conceivable that video surveillance that gives consideration to privacy of such a person is also needed. In this point, the image processing apparatus 2000 according to the present example embodiment performs the first treatment processing of making identification of a person difficult on a person region of the person 30 who satisfies the predetermined condition based on the permission list 40. In this way, video surveillance that gives consideration to privacy of a person captured by the camera 10 can be achieved by making identification difficult for the person 30 who satisfies the predetermined condition based on the permission list 40.

Note that, the above-described description referred to FIG. 1 is exemplification for facilitating understanding of the image processing apparatus 2000, and does not limit the function of the image processing apparatus 2000. Hereinafter, the image processing apparatus 2000 according to the present example embodiment will be described in more detail.

<Example of Functional Configuration>

Figure 2:
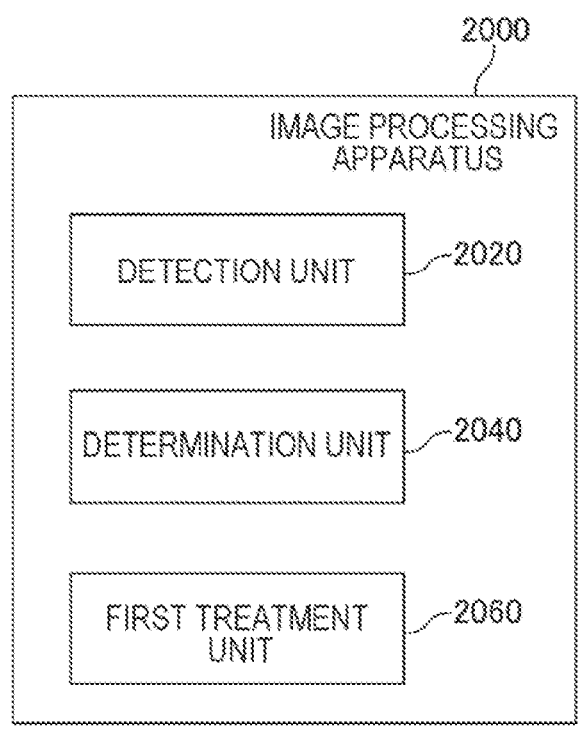
FIG. 2 is a diagram illustrating a functional configuration of the image processing apparatus according to the example embodiment 1.

FIG. 2 is a diagram illustrating a functional configuration of the image processing apparatus 2000 according to the example embodiment 1. The image processing apparatus 2000 according to the example embodiment 1 includes a detection unit 2020, a determination unit 2040, and a first treatment unit 2060. The detection unit 2020 acquires the video frame 14, and detects a person 30 from the video frame 14. The determination unit 2040 determines whether the detected person 30 satisfies a predetermined condition based on the permission list 40. The first treatment unit 2060 performs the first treatment processing on a person region representing the person 30 determined to satisfy the predetermined condition.

<Hardware Configuration of Image Processing Apparatus 2000>

Each functional component unit of the image processing apparatus 2000 may be achieved by hardware (for example, a hard-wired electronic circuit, and the like) that achieves each functional component unit, and may be achieved by a combination of hardware and software (for example, a combination of an electronic circuit and a program that controls the electronic circuit, and the like). Hereinafter, a case where each functional component unit of the image processing apparatus 2000 is achieved by the combination of hardware and software will be further described.

Figure 3:
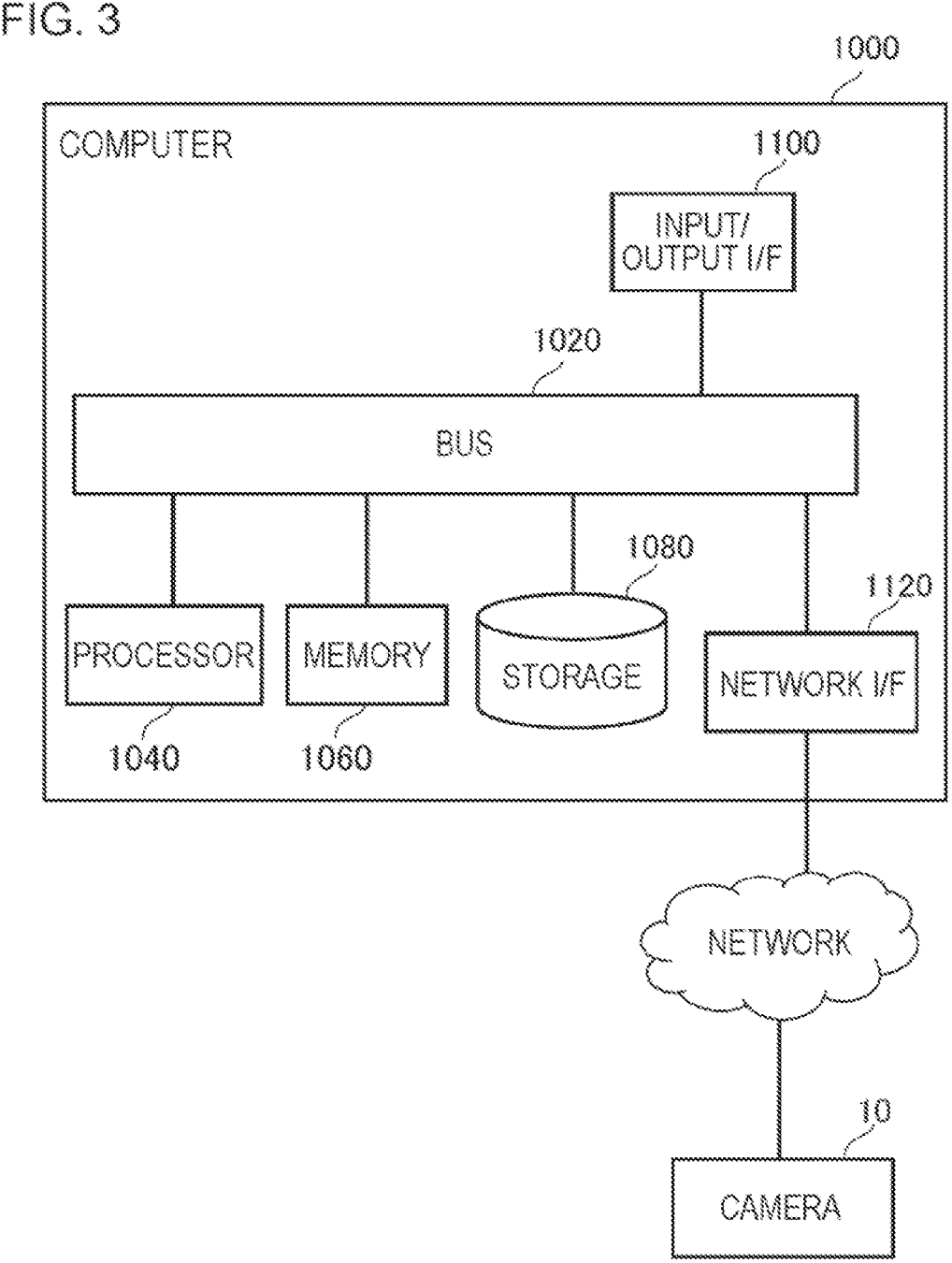
FIG. 3 is a diagram illustrating a computer for achieving the image processing apparatus.

FIG. 3 is a diagram illustrating a computer 1000 for achieving the image processing apparatus 2000. The computer 1000 is any computer. For example, the computer 1000 is a stationary computer such as a personal computer (PC) and a server machine. In addition, for example, the computer 1000 is a portable computer such as a smartphone and a tablet terminal. In addition, for example, the computer 1000 may be the camera 10. In this case, the camera 10 performs processing on the video frame 14 generated by the camera 10 itself. As the camera 10 having a function of operating as the image processing apparatus 2000, a camera referred to as an intelligent camera, a network camera, an internet protocol (IP) camera, or the like, for example, can be used.

The computer 1000 includes a bus 1020, a processor 1040, a memory 1060, a storage device 1080, an input/output interface 1100, and a network interface 1120. The bus 1020 is a data transmission path for allowing the processor 1040, the memory 1060, the storage device 1080, the input/output interface 1100, and the network interface 1120 to transmit and receive data with one another. However, a method of connecting the processor 1040 and the like to each other is not limited to bus connection.

The processor 1040 is various types of processors such as a central processing unit (CPU), a graphics processing unit (GPU), and a field-programmable gate array (FPGA). The memory 1060 is a main storage apparatus achieved by using a random access memory (RAM) and the like. The storage device 1080 is an auxiliary storage apparatus achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard and an output apparatus such as a display apparatus are connected to the input/output interface 1100.

The network interface 1120 is an interface for connecting the computer 1000 to a communication network. The communication network is, for example, a local area network (LAN) and a wide area network (WAN). A method of connection to the communication network by the network interface 1120 may be wireless connection or wired connection.

For example, the computer 1000 is communicably connected to the camera 10 via a network. However, a method of communicably connecting the computer 1000 to the camera 10 is not limited to connection via a network. Further, the computer 1000 may not be communicably connected to the camera 10.

The storage device 1080 stores a program module that achieves each functional component unit of the image processing apparatus 2000. The processor 1040 achieves a function associated with each program module by reading each of the program modules to the memory 1060 and executing the program module.

<With Regard to Camera 10>

The camera 10 is any camera that generates the video data 12 by performing capturing. The video data 12 are time-series data constituted by the plurality of video frames 14. The camera 10 may be a camera having a fixed position (hereinafter, a fixed camera), and may be a camera having a position that is not fixed (hereinafter, a mobile camera). The fixed camera is a camera fixed and installed at various places such as a wall, a pillar, or a ceiling. A place where the fixed camera is installed may be indoor and outdoor.

Note that, a wall and the like on which the fixed camera is installed may be fixed in a position for a certain period of time, and is not limited to being fixed in a way that they are not movable. For example, a wall and the like on which the fixed camera is installed may be a partition, a pillar, and the like being temporarily installed at an event site and the like.

In addition, for example, a moving body equipped with a camera that is also usable as a mobile camera described later may be stopped at a certain place, and the camera may be used as a fixed camera. The moving body is, for example, a car, a motorcycle, a robot, a flying object (such as a drone and an airship), or the like.

The mobile camera is, for example, a camera worn by a person or attached to the moving body described above and the like. The mobile camera worn by a person is, for example, a camera (a video camera and a camera of a portable terminal such as a smartphone) held by a hand, a camera (such as a wearable camera) fixed on a head, a chest, or the like, or the like. The camera attached to a car, a motorcycle, a robot, a flying object, or the like may be a camera attached for being used as a so-called drive recorder, and may be a camera attached separately for generating the video data 12 to be provided to the image processing apparatus 2000.

<Flow of Processing>

Figure 4:
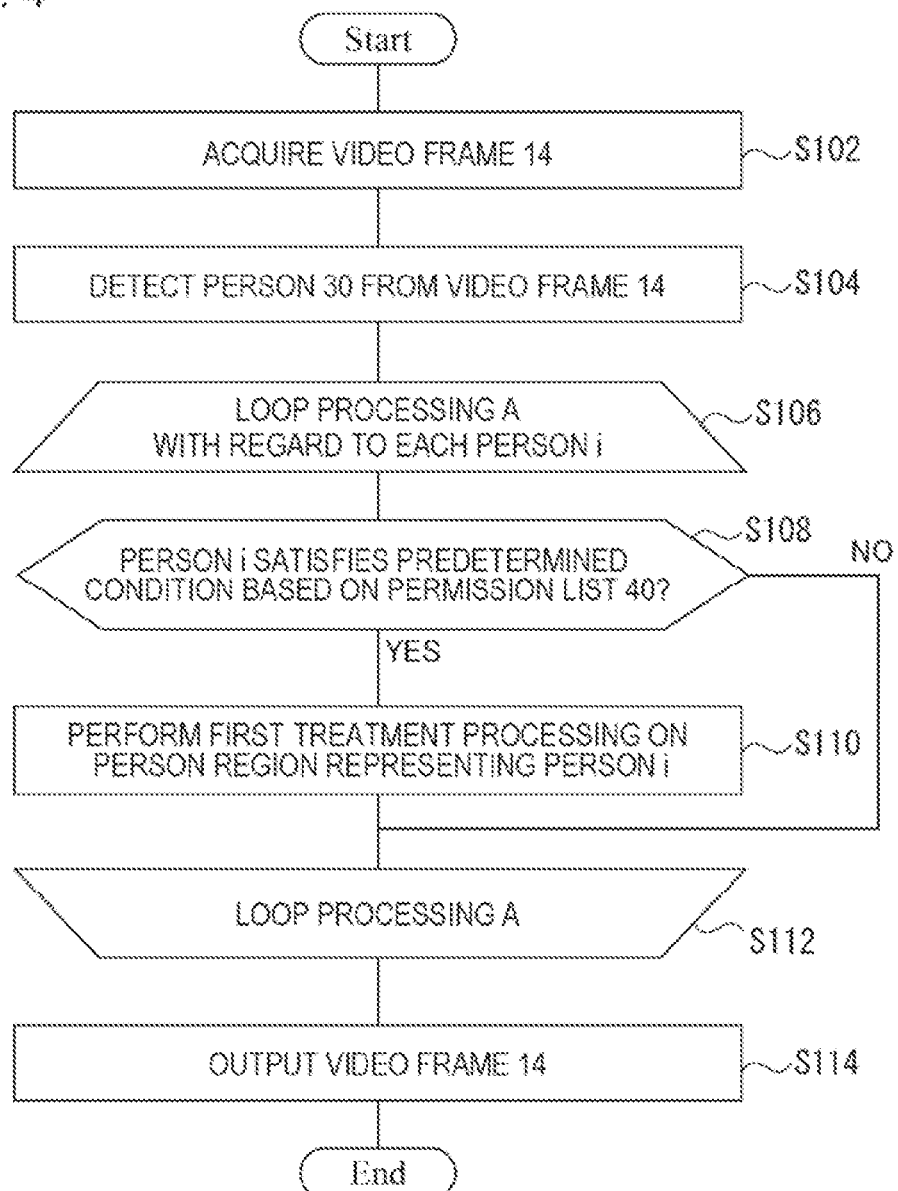
FIG. 4 is a flowchart illustrating a flow of processing performed by the image processing apparatus according to the example embodiment 1.

FIG. 4 is a flowchart illustrating a flow of processing performed by the image processing apparatus 2000 according to the example embodiment 1. Note that, a series of processing illustrated in the flowchart in FIG. 4 is performed on each video frame 14 constituting the video data 12.

The detection unit 2020 acquires the video frame 14 (S102). The detection unit 2020 detects the person 30 from the video frame 14 (S104).

S106 to S112 constitute loop processing A performed on each of the persons 30 detected from the video frame 14. In S106, the image processing apparatus 2000 determines whether the loop processing A has already been performed on all of the persons 30 as a target. When the loop processing A has already been performed on all of the persons 30 as a target, the processing in FIG. 4 proceeds to S114. On the other hand, when the person 30 that has not yet been a target of the loop processing A is present, the image processing apparatus 2000 selects one of the persons 30. The person 30 selected herein is expressed as a person i. After the selection of the person i is performed, the processing in FIG. 4 proceeds to S108.

The determination unit 2040 determines whether the person i satisfies a predetermined condition based on the permission list 40 (S108). When the person i satisfies the predetermined condition (S108: YES), the first treatment unit 2060 performs the first treatment processing on a person region representing the person i (S110). S112 is an end of the loop processing A, and thus the processing in FIG. 4 proceeds to S106.

After the loop processing A is finished, the image processing apparatus 2000 outputs the video frame 14 after the treatment (S114).

<Acquisition of Video Frame 14: S102>

The detection unit 2020 acquires the video frame 14 (S102). Various methods of acquiring the video frame 14 by the detection unit 2020 can be used. For example, the detection unit 2020 acquires the video frame 14 by receiving the video frame 14 transmitted from the camera 10. In addition, for example, the detection unit 2020 may access the camera 10, and acquire the video frame 14 stored in the camera 10. Note that, the camera 10 may store the video frame 14 in a storage apparatus provided outside the camera 10. In this case, the detection unit 2020 acquires the video frame 14 by accessing the storage apparatus.

When the camera 10 has a function of the image processing apparatus 2000 (when the camera 10 is used as the computer 1000), the detection unit 2020 acquires the video frame 14 stored in a storage apparatus (for example, the memory 1060 and the storage device 1080 in FIG. 2) inside the camera 10.

As described above, the video frame 14 constitutes the video data 12. The detection unit 2020 may acquire, on a one-by-one basis, the video frame 14 constituting the video data 12, and may collectively acquire the plurality of the video frame 14. For example, each time a new video frame 14 is generated, the detection unit 2020 acquires the video frame 14. In addition, for example, the detection unit 2020 collectively acquires, once in a predetermined period of time, the video frame 14 that has not yet been acquired.

<Detection of Person 30: S104>

The detection unit 2020 detects the person 30 from the video frame 14 (S104). An existing technique can be used as a technique for detecting a person from an image.

Herein, the detection unit 2020 performs management of each person 30 detected from each video frame 14. To do so, for example, the detection unit 2020 assigns an identifier to each person 30. At this time, an identifier assigned when a person 30 is detected from a past video frame 14 is used for the person 30 being already detected from the past video frame 14. Meanwhile, a new identifier is assigned to a person 30 being newly detected. As a technique for assigning an identifier to an object detected from each video frame constituting video data and managing the object in such a manner, an existing technique used for tracking and the like can be used.

For example, management of the person 30 detected from the video frame 14 is performed by generating information in which an identifier assigned to the person 30 and an image feature (feature value on an image) acquired from a person region representing the person 30 are associated with each other. Hereinafter, the information is referred to as person management information. Note that, various kinds of image features can be adopted for an image feature usable for identification of a person.

<Determination of Whether Predetermined Condition is Satisfied: S108>

The determination unit 2040 determines whether the person 30 satisfies a predetermined condition based on the permission list 40 (S108). The permission list 40 is previously stored in a storage apparatus that can be accessed from the image processing apparatus 2000. The permission list 40 indicates information that can identify a person. For example, the information is an image feature of a person.

As described above, the predetermined condition includes at least a condition that the "person 30 is included in the permission list 40". In order to determine whether the condition is satisfied, the determination unit 2040 compares an image feature (image feature acquired from a person region representing the person 30) of the person 30 with an image feature of each person indicated in the permission list 40. When the permission list 40 indicates an image feature similar to an image feature of the person 30, the determination unit 2040 determines that the condition that the "person 30 is included in the permission list 40" is satisfied. On the other hand, when the permission list 40 does not indicate an image feature similar to an image feature of the person 30, the determination unit 2040 determines that the condition that the "person 30 is included in the permission list 40" is not satisfied.

Determination of whether an image feature of the person 30 is similar to an image feature indicated in the permission list 40 is performed by, for example, computing a degree of similarity therebetween, and determining whether the degree of similarity is equal to or more than a predetermined value. An existing technique can be used as a technique for computing a degree of similarity between image features.

<<Other Condition 1: Place>>

The predetermined condition may further include a condition related to a place where the person 30 is captured. In this case, an image feature of the person 30 and identification information about the place are associated with each other in the permission list 40. Then, as the predetermined condition, an AND condition of two conditions that 1) an image feature similar to an image feature of the person 30 detected from the video frame 14 is included in the permission list 40, and 2) a place associated with the image feature in the permission list 40 coincides with a place where the person 30 is captured is used.

Thus, when an image feature similar to an image feature of the person 30 detected from the video frame 14 is included in the permission list 40, the determination unit 2040 compares an identifier of a place associated with the image feature with an identifier of a place where the person 30 is captured. Then, when the identifier of the place associated with the image feature in the permission list 40 coincides with the identifier of the place where the person 30 is captured, the determination unit 2040 determines that the person 30 satisfies the predetermined condition. On the other hand, when the identifiers of the places do not coincide with each other, the determination unit 2040 determines that the person 30 does not satisfy the predetermined condition. Further, when an image feature similar to an image feature of the person 30 is not included in the permission list 40, the determination unit 2040 also determines that the person 30 does not satisfy the predetermined condition.

A place where the person 30 is captured is determined by an installation place of the camera 10 that generates the video frame 14 including the person 30. For example, for each camera 10, information (hereinafter, camera information) in which an identifier of the camera 10 and an identifier of an installation place of the camera 10 are associated with each other is previously stored in a storage apparatus that can be accessed from the image processing apparatus 2000. The image processing apparatus 2000 acquires, in association with the video frame 14, an identifier (hereinafter, a camera identifier) of the camera 10 that generates the video frame 14. Then, the image processing apparatus 2000 acquires, by using the camera information, an identifier of an installation place being associated with the camera identifier of the camera 10 associated with the video frame 14, and uses the identifier of the installation place as an identifier of a place where the person 30 to be detected from the video frame 14 is captured. Note that, when the camera 10 functions as the image processing apparatus 2000, the camera 10 uses a camera identifier assigned to the camera 10 itself as an identifier of a place where the person 30 detected from the video frame 14 is captured.

In this way, necessity and importance of surveillance of a person can be determined for each place by taking a place where the person 30 is captured into consideration. For example, when a person is registered in the permission list 40 by a prior application as described later, it is conceivable to make the application that specifies a place. In this case, it is conceivable that necessity of surveillance of a person for whom a prior application is made is low at an applied place, whereas it is conceivable that necessity of surveillance of the person is not low at a place other than the applied place. Thus, for example, a person and a place for which a prior application is made are associated with each other in the permission list 40. In this way, the first treatment processing can be performed, for the person, only on the video frame 14 acquired at the place for which the prior application is made.

<<Other Condition 2: Level>>

In addition, for example, the predetermined condition may include a condition related to a comparison between a level of the person 30 and a level of a place where the person 30 is captured. In this case, for each place, a level representing importance of surveillance of the place is associated. Furthermore, an image feature of each person 30 and a level of the person 30 are associated with each other in the permission list 40. Then, as the predetermined condition, an AND condition of two conditions that 1) an image feature similar to an image feature of the person 30 detected from the video frame 14 is included in the permission list 40, and 2) a level associated with the image feature in the permission list 40 is equal to or more than a level of a place where the person 30 is captured is used.

Thus, when an image feature similar to an image feature of the person 30 detected from the video frame 14 is included in the permission list 40, the determination unit 2040 compares a level associated with the image feature with a level of a place where the person 30 is captured. Then, when the level associated with the image feature of the person 30 is equal to or more than the level of the place where the person 30 is captured, the determination unit 2040 determines that the person 30 satisfies the predetermined condition. On the other hand, when the level associated with the image feature of the person 30 is lower than the level of the place where the person 30 is captured, the determination unit 2040 determines that the person 30 does not satisfy the predetermined condition. Further, when an image feature similar to an image feature of the person 30 is not included in the permission list 40, the determination unit 2040 also determines that the person 30 does not satisfy the predetermined condition.

For example, a level of a place is set for each camera 10. In other words, camera information in which an identifier of the camera 10 and a level of a place where the camera 10 is installed are associated with each other is prepared. The determination unit 2040 acquires camera information about the camera 10 that generates the video frame 14, and uses a level indicated in the camera information as a level of a place where the person 30 detected from the video frame 14 is captured.

For example, a level of a place represents importance of surveillance of the place, and a level of a person represents a degree of necessity (reliability of the person) of surveillance of the person. In this way, whether the first treatment processing is performed for each person can be determined by weighing up the importance of the place and the reliability of the person.

For example, a level of a person is set according to a kind and an amount of personal information provided from the person. For example, a level of a person who provides biometric information (information about a face, a fingerprint, a vein, an iris, or the like) usable for biometric authentication is set higher than a level of a person who provides only simple information such as a name, an address, and an SNS account. Further, it is conceivable that a higher level is set for a person who also provides information about his/her family in addition to information about himself/herself.

<Cache of Determination Result>

For a person 30 on which determination of the predetermined condition is already performed when the person 30 is detected from a past video frame 14, the determination may be omitted. For example, when determination of whether a certain person 30 satisfies the predetermined condition is performed, the determination unit 2040 records a cache representing a result of the determination in person management information described above. In other words, in association with an identifier of the person 30 on which determination of the predetermined condition is performed, a result of the determination is recorded in person management information.

When the determination unit 2040 determines whether the person 30 detected from the video frame 14 satisfies the predetermined condition, the determination unit 2040 determines whether a cache of a determination result is present by first referring to person management information about the person 30. When the cache is present, the determination unit 2040 uses the determination result indicated in the cache. On the other hand, when the cache is not present, the determination unit 2040 performs, by the method described above, determination of whether the predetermined condition is satisfied.

By using a cache of a determination result in such a manner, time required for determination of whether the predetermined condition is satisfied can be reduced.

Note that, when a condition such as a place and a level is included in the predetermined condition, a cache of a determination result also includes information representing which place the determination is performed on. In other words, a combination of an "identifier of a place where the person 30 is captured and a determination result" is recorded, in person management information, in association with an identifier of the person 30 on which determination of the predetermined condition is performed.

In this way, determination processing of whether the person 30 satisfies the predetermined condition can be omitted when the person 30 appears at the same place for a plurality of times, whereas the determination processing for a new place can be performed when the person 30 appears at the new place. Thus, while the determination processing for each place can be achieved, time required for the determination processing can be reduced.

<First Treatment Processing: S110>

When it is determined that the person 30 satisfies the predetermined condition based on the permission list 40 (S108: YES), the first treatment unit 2060 performs the first treatment processing on a person region representing the person 30 (S110). As described above, the first treatment processing is processing of making a person hard to identify. Particularly, it is suitable to perform processing of making identification of a face difficult. Hereinafter, a variation of the first treatment processing is illustrated. Note that, treatment described later may be performed only on a part of a person region, such as only on a region of a face.

<<Deletion Processing>>

For example, the first treatment unit 2060 performs, as the first treatment processing, processing of deleting a person region representing the person 30 from the video frame 14. Deletion of a person region is achieved by superimposing an image of a background on the person region, for example. The image of a background can be extracted from the video frame 14 that does not include the person 30, for example.

The video frame 14 that does not include the person 30 is previously stored in a storage apparatus that can be accessed from the first treatment unit 2060.

The first treatment unit 2060 may replace a person region with anything other than a background. For example, as such processing, there are processing of filling a person region with a predetermined color, processing of replacing a person region with a background and then superimposing a predetermined mark on the portion, and the like. By performing filling and superimposition of a mark, a person who views the video frame 14 cannot identify the person 30, but can recognize that there is a person in the portion.

Herein, the color and the mark described above may be used commonly to all persons, and may be determined according to an attribute of a person. As the attribute of a person, for example, there are gender, an age group, and the like. By using a color and a mark varying for each attribute, such as gender and an age group, in such a manner, a person who views the video frame 14 cannot identify the person 30, but can recognize what kind of a person is present. Video surveillance may be used for not only recognizing a dangerous person but also for recognizing a person who needs help, and thus it is preferable that an attribute of a person can be recognized from the video frame 14 in such a manner. Note that, information in which a color and a mark are associated with an attribute of a person is previously prepared in a storage apparatus that can be accessed from the first treatment unit 2060.

<<Blending of a Background>>

In addition, for example, the first treatment unit 2060 performs, as the first treatment processing, processing of blending a person region representing the person 30 and a background. In this way, the background can be viewed through the person region (the person region becomes semitransparent). As processing of making a background visible through an object such as a person by blending an image region representing the object and the background in such a manner, an existing technique can be used.

<<Other Processing>>

In addition, for example, the first treatment unit 2060 may add, as the first treatment processing, any processing of making the person 30 hard to identify, such as processing of putting mosaic, processing of making it blurry, processing of reducing a resolution, processing of adding random noise, or the like, to a person region representing the person 30.

<Output of Result: S114>

The image processing apparatus 2000 outputs the video frame 14 after the treatment (S114). Herein, the image processing apparatus 2000 successively performs the processing on each video frame 14 constituting the video data 12, and outputs a result. In this way, the video data 12 constituted by the video frame 14 after the treatment are output.

There are various output destinations of the video frame 14. For example, the image processing apparatus 2000 outputs the video frame 14 to a display apparatus. For example, the display apparatus is viewed by a supervisor and the like. In addition, for example, the image processing apparatus 2000 may output the video frame 14 to a storage apparatus that can be accessed from each terminal being used for viewing the video data 12. In this way, the video data 12 constituted by the video frame 14 subjected to the treatment by the image processing apparatus 2000 can be viewed from various terminals.

<With Regard to Method of Generating Permission List 40>

The permission list 40 can be generated by any method. Hereinafter, a functional configuration unit that generates the permission list 40 is referred to as a permission list generation unit. The permission list generation unit may be provided in the image processing apparatus 2000, and may be provided in an apparatus other than the image processing apparatus 2000. When the permission list generation unit is provided in an apparatus other than the image processing apparatus 2000, a hardware configuration of the apparatus can be similar to the hardware configuration of the image processing apparatus 2000 (see FIG. 3).

For example, the permission list generation unit receives a use application in advance from a person who desires to use a facility to be surveyed and the like, adds information related to the person to the permission list 40 according to the application, and thus generates and updates the permission list 40. An image feature of a person to be included in the permission list 40 is extracted from a picture attached to a use application, for example.

In addition, for example, a gate may be provided at a place to be surveyed, and an application for entering the gate may be received near the gate. For example, an apparatus that receives an input of a name and an address, and an apparatus that receives registration (such as photographing of a face picture or reading of a fingerprint and an iris) of biometric information are installed near a gate. Then, an application for an entry into the gate is received by registration of personal information using the apparatuses. For example, the permission list generation unit generates the permission list 40 indicating a person who registers personal information herein. At this time, the permission list generation unit sets the level described above for a person who makes an application in the permission list 40 according to a kind and an amount of registered personal information. In this way, determination using the predetermined condition including the "other condition 2" described above can be performed.

Note that, the gate described above may be provided at not only an entrance of a facility but also at each gateway of a place having different importance of surveillance in the facility, and an entry application may be made at each place. In the permission list 40, a place where an entry application of a person is made is associated, in association with the person. In this way, determination using the predetermined condition including the "other condition 1" described above can be performed.

Example Embodiment 2

An image processing apparatus 2000 according to an example embodiment 2 performs, on a person region of a person 30 determined not to satisfy a predetermined condition based on a permission list 40, second treatment processing based on a degree of suspiciousness of the person 30. The second treatment processing is treatment processing for further facilitating surveillance of the person 30 having a higher degree of suspiciousness. For example, the second treatment processing is emphasis processing (such as superimposition of a frame) for a person region of the person 30 having a high degree of suspiciousness. In addition, for example, the second treatment processing may be processing similar to the first treatment processing described above being performed on the person 30 having a low degree of suspiciousness. A degree of suspiciousness is determined based on a result of a behavior analysis performed in advance.

The image processing apparatus 2000 according to the present example embodiment further facilitates surveillance of the person 30 having a higher degree of suspiciousness among the persons 30 determined not to satisfy the predetermined condition based on the permission list 40. In this way, in a case where many persons who do not satisfy the predetermined condition based on the permission list 40 (for example, persons who have not made a prior use application) are included in a video frame 14, a person having a higher degree of suspiciousness can be more easily surveyed.

Hereinafter, the image processing apparatus 2000 according to the present example embodiment will be described in more detail.

<Example of Functional Configuration>

Figure 5:
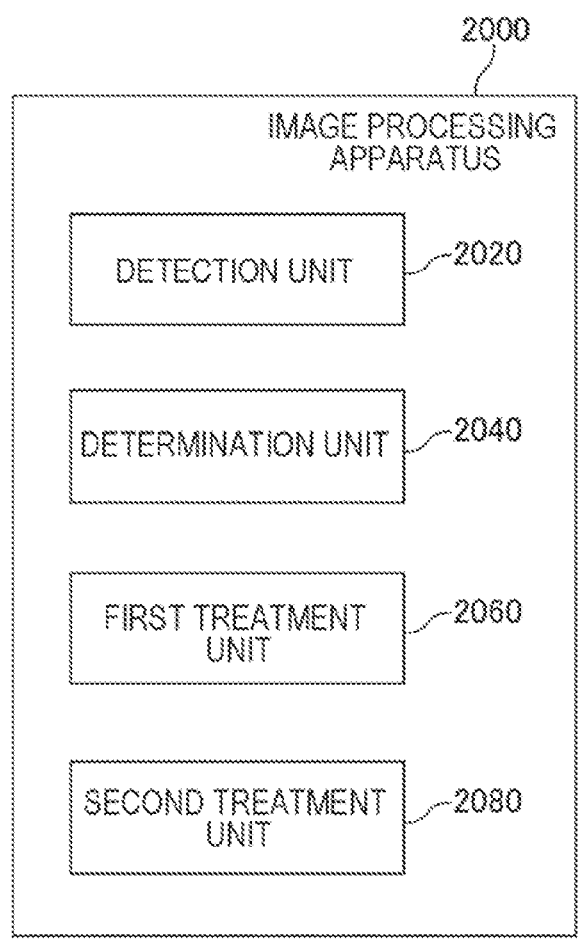
FIG. 5 is a diagram illustrating a functional configuration of an image processing apparatus according to an example embodiment 2.

FIG. 5 is a diagram illustrating a functional configuration of the image processing apparatus 2000 according to the example embodiment 2. The image processing apparatus 2000 according to the example embodiment 2 further includes a second treatment unit 2080. The second treatment unit 2080 determines a degree of suspiciousness of the person 30 determined not to satisfy the predetermined condition based on the permission list 40, and performs, on a person region representing the person 30 in the video frame 14, the second treatment processing based on the degree of suspiciousness of the person 30.

<Example of Hardware Configuration>

A hardware configuration of a computer that achieves the image processing apparatus 2000 according to the example embodiment 2 is represented in FIG. 3, for example, similarly to the example embodiment 1. However, a program module that achieves a function of the image processing apparatus 2000 according to the present example embodiment is stored in a storage device 1080 of a computer 1000 that achieves the image processing apparatus 2000 according to the present example embodiment.

<Flow of Processing>

Figure 6:
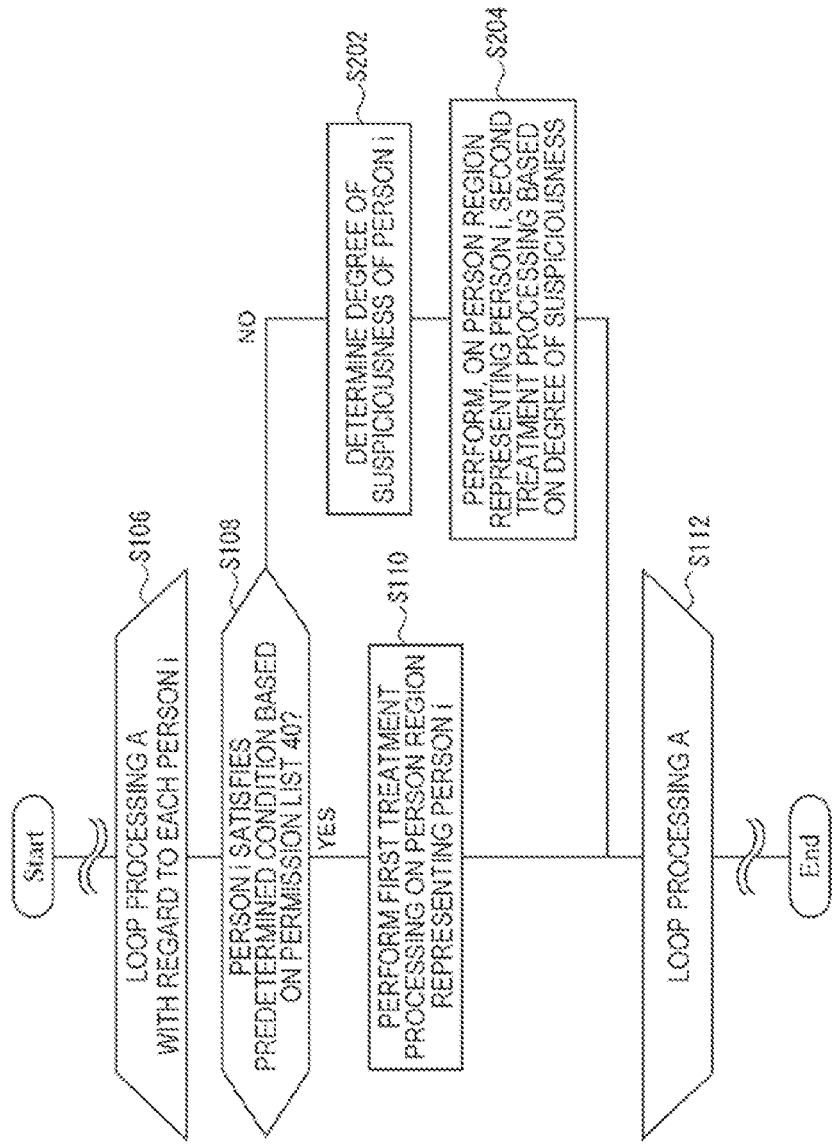
FIG. 6 is a flowchart illustrating processing performed by the image processing apparatus according to the example embodiment 2.

FIG. 6 is a flowchart illustrating processing performed by the image processing apparatus 2000 according to the example embodiment 2. The flowchart in FIG. 6 is the same as the flowchart in FIG. 4 except for a point that steps described below are included.

When it is determined that a person i does not satisfy the predetermined condition based on the permission list 40 (S108: NO), the second treatment unit 2080 determines a degree of suspiciousness of the person i (S202). The second treatment unit 2080 performs, based on the degree of suspiciousness of the person i, the second treatment processing on a person region representing the person i (S204).

<Determination of Degree of Suspiciousness: S202>

The second treatment unit 2080 determines a degree of suspiciousness of the person 30 (S202). The degree of suspiciousness of the person 30 is determined based on behavior of the person 30 at a facility to be surveyed and the like, for example. Specifically, a behavior analysis of each captured person is previously performed by using video data 12 generated by each camera 10 set at a place to be surveyed. In the behavior analysis, a degree of suspiciousness of each person is computed based on suspicious behavior such as loitering, dwelling, and abandonment of baggage, for example. The computed degree of suspiciousness is included in person management information described above. In this case, the second treatment unit 2080 determines the degree of suspiciousness of the person 30 by referring to the person management information about the person 30.

In addition, for example, a degree of suspiciousness of the person 30 may be computed by analyzing behavior of the person 30 on the Internet. The behavior on the Internet is, for example, a post, a message, and the like in a social networking service (SNS). For example, a system in which, "when there is a person who writes a suspicious post or a suspicious message on the Internet, information in which a history of the suspicious behavior and a face picture of the person are associated with each other is provided" is previously created. Such a system can be created by cooperating with an administrator of an SNS, for example.

For example, information (hereinafter, a refusal list) in which a degree of suspiciousness and an image feature of a person are associated with each other is generated by an analysis of behavior on the Internet. The generated refusal list is stored in a storage apparatus that can be accessed from the second treatment unit 2080. The generation of the refusal list may be performed by the image processing apparatus 2000, and may be performed by another apparatus.

Herein, there may be a case where the person 30 detected from the video frame 14 is not included in the refusal list. In this case, the second processing unit 2080 sets a predetermined low degree of suspiciousness (for example, a degree of suspiciousness=0) for the person 30.

Note that, a degree of suspiciousness based on a behavior analysis using the video data 12 and a degree of suspiciousness indicated in the refusal list may be used together. For example, the second treatment unit 2080 determines a degree of suspiciousness of the person 30 from a statistic (such as weighted addition and a maximum value) of the two degrees of suspiciousness.

<Second Treatment Processing: S204>

The second treatment unit 2080 performs, based on the degree of suspiciousness of the person 30, the second treatment processing on a person region representing the person 30 (S204). For example, the second treatment processing is processing of making the person 30 having a higher degree of suspiciousness more conspicuous (emphasizing the person 30 having a higher degree of suspiciousness). For example, the second treatment unit 2080 superimposes a frame and a mark on a person region of the person 30 having a degree of suspiciousness equal to or more than a threshold value. Further, a color and a shape of a frame and a mark may be determined according to a level of a degree of suspiciousness. For example, a frame is made thicker as a degree of suspiciousness is higher, and a color of a frame is set to be a more conspicuous color as a degree of suspiciousness is higher.

In addition, for example, the second treatment processing may be processing of making the person 30 having a lower degree of suspiciousness less conspicuous. For example, the second treatment unit 2080 performs processing (processing of reducing opacity) of blending, with a background, a person region of the person 30 having a degree of suspiciousness equal to or less than a predetermined threshold value.

While the example embodiments of the present invention have been described with reference to the drawings, the example embodiments are only exemplification of the present invention, and a configuration that combines the example embodiments described above and various configurations other than the above-described example embodiments can also be employed.

The whole or part of the example embodiments described above can be described as, but not limited to, the following supplementary notes.

1. An image processing apparatus, including:
   a detection unit that acquires a video frame, and detects a person from the acquired video frame;
   a determination unit that determines whether the detected person satisfies a predetermined condition based on a permission list; and
   a first treatment processing unit that performs, on an image region in the video frame representing the person being determined to satisfy the predetermined condition, first treatment processing of setting the person in a hardly identified state, wherein
   the predetermined condition includes a condition that the person is indicated in the permission list.

2. The image processing apparatus according to supplementary note 1, wherein
   the permission list associates a person and a place with each other, and
   the predetermined condition further includes a condition that a place where the detected person is captured is associated with the person in the permission list.

3. The image processing apparatus according to supplementary note 1, wherein
   the permission list associates a person and a level with each other, and
   the predetermined condition includes a condition that a level associated with the detected person is equal to or more than a surveillance level of a place where the detected person is captured.

4. The image processing apparatus according to supplementary note 3, wherein
   a level indicated in association with the person in the permission list is determined by either one or both of an amount and a kind of personal information provided by the person.

5. The image processing apparatus according to supplementary notes 1 to 4, wherein
   the first treatment processing is any one of
   processing of replacing an image region representing the person with a background,
   processing of filling an image region representing the person with a predetermined color,
   processing of replacing an image region representing the person with a background, and superimposing a predetermined mark on the image region, and
   processing of blending an image region representing the person with a background.

6. The image processing apparatus according to any one of supplementary notes 1 to 5, further including
   a second treatment processing unit that determines a degree of suspiciousness of the person being determined not to satisfy the predetermined condition, and performs, on an image region representing the person in the video frame, second treatment processing based on the determined degree of suspiciousness.

7. The image processing apparatus according to supplementary note 6, wherein
   a degree of suspiciousness of the person is determined by any one or more of an analysis of behavior of the person at a place to be surveyed, and an analysis of behavior of the person on the Internet.

8. The image processing apparatus according to supplementary note 6 or 7, wherein
   the second treatment processing is emphasis processing being performed on an image region representing the person having the degree of suspiciousness equal to or more than a threshold value, or processing of making a person hard to identify being performed on an image region representing the person having the degree of suspiciousness smaller than a threshold value.

9. A control method executed by a computer, including:
   a detection step of acquiring a video frame, and detecting a person from the acquired video frame;

a determination step of determining whether the detected person satisfies a predetermined condition based on a permission list; and a first treatment processing step of performing, on an image region in the video frame representing the person being determined to satisfy the predetermined condition, first treatment processing of setting the person in a hardly identified state, wherein the predetermined condition includes a condition that the person is indicated in the permission list.

10. The control method according to supplementary note 9, wherein the permission list associates a person and a place with each other, and the predetermined condition further includes a condition that a place where the detected person is captured is associated with the person in the permission list.

11. The control method according to supplementary note 9, wherein the permission list associates a person and a level with each other, and the predetermined condition includes a condition that a level associated with the detected person is equal to or more than a surveillance level of a place where the detected person is captured.

12. The control method according to supplementary note 11, wherein a level indicated in association with the person in the permission list is determined by either one or both of an amount and a kind of personal information provided by the person.

13. The control method according to supplementary notes 9 to 12, wherein the first treatment processing is any one of processing of replacing an image region representing the person with a background, processing of filling an image region representing the person with a predetermined color, processing of replacing an image region representing the person with a background, and superimposing a predetermined mark on the image region, and processing of blending an image region representing the person with a background.

14. The control method according to any one of supplementary notes 9 to 13, further including a second treatment processing step of determining a degree of suspiciousness of the person being determined not to satisfy the predetermined condition, and performing, on an image region representing the person in the video frame, second treatment processing based on the determined degree of suspiciousness.

15. The control method according to supplementary note 14, wherein a degree of suspiciousness of the person is determined by any one or more of an analysis of behavior of the person at a place to be surveyed, and an analysis of behavior of the person on the Internet.

16. The control method according to supplementary note 14 or 15, wherein the second treatment processing is emphasis processing being performed on an image region representing the person having the degree of suspiciousness equal to or more than a threshold value, or processing of making a person hard to identify being performed on an image region representing the person having the degree of suspiciousness smaller than a threshold value.

17. A program causing a computer to execute each step of the control method according to any one of supplementary notes 9 to 16.

What is claimed is:

1. An image processing apparatus comprising:
at least one memory storing one or more instructions; and
at least one processor configured to execute the one or more instructions to:
acquire a video frame, and detect a person from the acquired video frame;
determine whether the detected person satisfies a predetermined condition including a condition that the detected person is indicated in a permission list; and
in a case in which the predetermined condition has been satisfied such that the detected person is in the permission list, perform, on an image region in the video frame including the detected person, first treatment processing to make the detected person more difficult to identify in the image region; and
in a case in which the predetermined condition has not been satisfied such that the detected person is not in the permission list:
do not perform the first treatment process such that the detected person is not made more difficult to identify in the image region;
determine a degree of suspiciousness of the detected person; and
perform, on the image region including the detected person, second treatment processing based on the determined degree of suspiciousness, wherein
the second treatment processing is
in a case in which the degree of suspiciousness is equal to or more than a threshold value, processing of emphasizing the image region including the detected person; and
in a case in which the degree of suspiciousness is smaller than the threshold value, processing of making the detected person more difficult to identify in the image region.

2. The image processing apparatus according to claim 1, wherein the permission list associates a person and a place with each other, and the predetermined condition further includes a condition that a place where the detected person is captured is associated with the person in the permission list.

3. The image processing apparatus according to claim 1, wherein the permission list associates a person and a level with each other, and the predetermined condition includes a condition that a level associated with the detected person is equal to or more than a surveillance level of a place where the detected person is captured.

4. The image processing apparatus according to claim 3, wherein the level indicated in association with the person in the permission list is determined by either one or both of an amount and a kind of personal information provided by the person in the permission list.

5. The image processing apparatus according to claim 1, wherein the first treatment processing is any one of processing of replacing the image region including the detected person with a background, processing of filling the image region including the detected person with a predetermined color, processing of replacing the image region including the detected person with a background, and superimposing a predetermined mark on the image region, and processing of blending the image region including the detected person with a background.

6. The image processing apparatus according to claim 1, wherein the degree of suspiciousness of the detected person is determined by any one or more of an analysis of behavior of the detected person at a place to be surveyed, and an analysis of behavior of the detected person on the Internet.

7. A control method executed by a computer and comprising:

acquiring a video frame, and detect a person from the acquired video frame;

determining whether the detected person satisfies a predetermined condition including a condition that the detected person is indicated in a permission list; and in a case in which the predetermined condition has been satisfied such that the detected person is in the permission list, performing, on an image region in the video frame including the detected person, first treatment processing to make the detected person more difficult to identify in the image region; and in a case in which the predetermined condition has not been satisfied such that the detected person is not in the permission list:

not performing the first treatment process such that the detected person is not made more difficult to identify in the image region;

determining a degree of suspiciousness of the detected person; and performing, on the image region including the detected person, second treatment processing based on the determined degree of suspiciousness, wherein the second treatment processing is in a case in which the degree of suspiciousness is equal to or more than a threshold value, processing of emphasizing the image region including the detected person; and in a case in which the degree of suspiciousness is smaller than the threshold value, processing of making the detected person more difficult to identify in the image region.

8. The control method according to claim 7, wherein the permission list associates a person and a place with each other, and the predetermined condition further includes a condition that a place where the detected person is captured is associated with the person in the permission list.

9. The control method according to claim 7, wherein the permission list associates a person and a level with each other, and the predetermined condition includes a condition that a level associated with the detected person is equal to or more than a surveillance level of a place where the detected person is captured.

10. The control method according to claim 9, wherein the level indicated in association with the person in the permission list is determined by either one or both of an amount and a kind of personal information provided by the person in the permission list.

11. The control method according to claim 7, wherein the first treatment processing is any one of processing of replacing the image region including the detected person with a background, processing of filling the image region including the detected person with a predetermined color, processing of replacing the image region including the detected person with a background, and superimposing a predetermined mark on the image region, and processing of blending the image region including the detected person with a background.

12. The control method according to claim 7, wherein the degree of suspiciousness of the detected person is determined by any one or more of an analysis of behavior of the detected person at a place to be surveyed, and an analysis of behavior of the detected person on the Internet.

13. A non-transitory storage medium storing a program causing a computer to execute the control method according to claim 7.

* * * * *